United States Patent
Kawaguchi et al.

(10) Patent No.: US 11,183,791 B2
(45) Date of Patent: *Nov. 23, 2021

(54) WIRE HARNESS WITH ELASTIC TUBE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Tomoya Kawaguchi, Yokkaichi (JP); Masaharu Suetani, Yokkaichi (JP)

(73) Assignees: AUTONETWORKS TECHNOLOGIES, LTD., Mie (JP); SUMITOMO WIRING SYSTEMS, LIMITED, Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/981,120

(22) PCT Filed: Mar. 11, 2019

(86) PCT No.: PCT/JP2019/009569
§ 371 (c)(1),
(2) Date: Sep. 15, 2020

(87) PCT Pub. No.: WO2019/188162
PCT Pub. Date: Oct. 3, 2019

(65) Prior Publication Data
US 2021/0021080 A1    Jan. 21, 2021

(30) Foreign Application Priority Data
Mar. 30, 2018 (JP) .............................. JP2018-069926

(51) Int. Cl.
H01R 13/52 (2006.01)
B60R 16/02 (2006.01)
(Continued)

(52) U.S. Cl.
CPC ..... H01R 13/5219 (2013.01); B60R 16/0207 (2013.01); H01B 7/0045 (2013.01); H01R 4/72 (2013.01); H02G 3/0468 (2013.01)

(58) Field of Classification Search
None
See application file for complete search history.

(56) References Cited

U.S. PATENT DOCUMENTS 2,419,592 A * 4/1947 Richardson ........ H01R 13/5205
277/314
3,629,792 A * 12/1971 Dorrell .............. H01R 13/5205
439/279
(Continued)

FOREIGN PATENT DOCUMENTS

JP   H08-064301 A    3/1996
JP   2007-287464 A   11/2007
(Continued)

OTHER PUBLICATIONS

Jun. 4, 2019 Search Report issued in International Patent Application No. PCT/JP2019/009569.

*Primary Examiner* — Timothy J. Dole
*Assistant Examiner* — Muhammed Azam
(74) *Attorney, Agent, or Firm* — Oliff PLC

(57) ABSTRACT

A wire harness including an electric wire that has a core wire and a core wire coating that coats the core wire, a connector that is attached to an end of the electric wire, and a seal that is interposed between the electric wire and the connector, wherein a tube with a modulus of elasticity higher than that of the core wire coating, and an outer coating that coats the (Continued)

tube from an outer side are provided between the electric wire and the seal.

3 Claims, 2 Drawing Sheets

(51) Int. Cl.
    *H01B 7/00*     (2006.01)
    *H01R 4/72*     (2006.01)
    *H02G 3/04*     (2006.01)

(56) References Cited

U.S. PATENT DOCUMENTS

| | | | | |
|---|---|---|---|---|
| 4,163,117 | A * | 7/1979 | Campbell | B29C 61/0625 |
| | | | | 174/74 A |
| 5,168,124 | A * | 12/1992 | Takase | H01R 4/70 |
| | | | | 174/23 R |
| 5,357,057 | A * | 10/1994 | Debbaut | H01B 17/60 |
| | | | | 174/76 |
| 5,580,264 | A | 12/1996 | Aoyama et al. | |
| 5,589,666 | A * | 12/1996 | DeCarlo | H02G 1/14 |
| | | | | 156/48 |
| 5,669,790 | A * | 9/1997 | Carson | A61N 1/3752 |
| | | | | 439/668 |
| 5,804,767 | A * | 9/1998 | Winfield | H02G 15/013 |
| | | | | 174/74 R |
| 5,827,086 | A * | 10/1998 | Fukuda | H01R 13/6272 |
| | | | | 439/357 |
| 6,439,929 | B1 * | 8/2002 | Jenets | H01R 13/65912 |
| | | | | 439/607.51 |
| 6,851,970 | B2 * | 2/2005 | Yamanashi | H01R 12/592 |
| | | | | 439/499 |
| 7,084,377 | B2 * | 8/2006 | Raterman | B05B 7/1693 |
| | | | | 219/481 |
| 8,015,889 | B2 * | 9/2011 | Wingett | F16H 25/20 |
| | | | | 74/89.23 |
| 8,241,062 | B2 * | 8/2012 | Tsuruta | H01R 13/506 |
| | | | | 439/589 |
| 8,277,250 | B2 * | 10/2012 | Suzuki | H01R 13/504 |
| | | | | 439/604 |
| 8,342,880 | B2 * | 1/2013 | Kato | H01R 13/4223 |
| | | | | 439/595 |
| 9,054,434 | B2 * | 6/2015 | Kakuta | H01R 4/72 |
| 9,214,756 | B2 * | 12/2015 | Nishio | G02B 6/4284 |
| 9,525,220 | B1 * | 12/2016 | Burris | H01R 24/40 |
| 9,616,826 | B2 * | 4/2017 | Inao | H02G 3/06 |
| 9,902,346 | B2 * | 2/2018 | Kugimiya | B60R 16/0207 |
| 9,994,170 | B2 * | 6/2018 | Yanazawa | B60R 16/0215 |
| 10,003,177 | B2 * | 6/2018 | Nakashima | H02G 3/0406 |
| 10,014,622 | B2 * | 7/2018 | Kondo | H01R 13/521 |
| 10,050,375 | B1 * | 8/2018 | Semple | H01R 13/5205 |
| 2004/0172151 | A1 * | 9/2004 | Sawai | G06F 30/23 |
| | | | | 700/103 |
| 2005/0136738 | A1 * | 6/2005 | Wada | H01R 13/65912 |
| | | | | 439/607.43 |
| 2011/0159729 | A1 * | 6/2011 | Suzuki | H01R 13/504 |
| | | | | 439/587 |
| 2012/0024599 | A1 * | 2/2012 | Yamashita | H02G 15/04 |
| | | | | 174/74 R |
| 2012/0094539 | A1 * | 4/2012 | Ooki | H01R 13/504 |
| | | | | 439/625 |
| 2012/0261186 | A1 * | 10/2012 | Kakuta | H01R 4/22 |
| | | | | 174/75 R |
| 2013/0084728 | A1 * | 4/2013 | Omae | H01R 13/648 |
| | | | | 439/271 |
| 2013/0118803 | A1 * | 5/2013 | Magno, Jr. | H02G 15/013 |
| | | | | 174/77 R |
| 2013/0309905 | A1 * | 11/2013 | Tanaka | C08L 53/025 |
| | | | | 439/587 |
| 2013/0322827 | A1 * | 12/2013 | Reimann | G02B 6/4401 |
| | | | | 385/77 |
| 2014/0094049 | A1 | 4/2014 | Ohyama et al. | |
| 2014/0113486 | A1 * | 4/2014 | Wild | H01R 4/029 |
| | | | | 439/578 |
| 2014/0251681 | A1 * | 9/2014 | Adachi | H02G 3/0481 |
| | | | | 174/72 A |
| 2014/0295710 | A1 * | 10/2014 | Inagaki | H01R 13/5812 |
| | | | | 439/660 |
| 2015/0068800 | A1 * | 3/2015 | Yamasaki | H02G 15/1806 |
| | | | | 174/72 A |
| 2015/0101842 | A1 * | 4/2015 | Han | B60R 16/0215 |
| | | | | 174/50.57 |
| 2015/0136482 | A1 * | 5/2015 | Adachi | H02G 3/0468 |
| | | | | 174/72 A |
| 2015/0147918 | A1 * | 5/2015 | Matsuda | H01R 13/5841 |
| | | | | 439/694 |
| 2015/0255974 | A1 * | 9/2015 | Burrow | H02G 15/043 |
| | | | | 174/77 R |
| 2016/0036156 | A1 * | 2/2016 | Iihoshi | H01R 13/5202 |
| | | | | 439/587 |
| 2017/0003455 | A1 * | 1/2017 | Cairns | H02G 15/04 |
| 2017/0170590 | A1 * | 6/2017 | Ko | H01R 13/2407 |
| 2017/0229808 | A1 * | 8/2017 | Mukuno | H01R 13/58 |
| 2018/0131124 | A1 * | 5/2018 | Matlack | H01R 13/5205 |
| 2018/0151976 | A1 * | 5/2018 | Kitagawa | H01R 13/5205 |
| 2018/0175532 | A1 * | 6/2018 | Mukuno | H01R 13/15 |
| 2018/0218807 | A1 * | 8/2018 | Takahashi | B60R 16/0215 |
| 2018/0286537 | A1 * | 10/2018 | Horiuchi | H01B 3/30 |
| 2018/0287293 | A1 * | 10/2018 | Furuya | H01R 13/5208 |
| 2018/0301886 | A1 * | 10/2018 | Yamasaki | B32B 27/32 |
| 2019/0067868 | A1 * | 2/2019 | Cairns | H01R 13/5219 |
| 2019/0115685 | A1 * | 4/2019 | Cairns | H02G 15/013 |
| 2019/0296485 | A1 * | 9/2019 | Masuda | H01R 13/62938 |
| 2019/0356084 | A1 * | 11/2019 | Misu | H01R 13/5812 |
| 2020/0411216 | A1 * | 12/2020 | Kawaguchi | H01R 4/72 |
| 2021/0021080 | A1 * | 1/2021 | Kawaguchi | H01R 4/72 |

FOREIGN PATENT DOCUMENTS

| | | |
|---|---|---|
| JP | 2008-204960 A | 9/2008 |
| JP | 2013-038040 A | 2/2013 |
| JP | 2016-212976 A | 12/2016 |
| JP | 2017-079562 A | 4/2017 |

* cited by examiner

WIRE HARNESS WITH ELASTIC TUBE

BACKGROUND

The present disclosure relates to a wire harness.

Conventionally, as wire harnesses mounted in automobiles and the like, those having electric wires and connectors provided at terminals of the electric wires (see JP 2008-204960A, for example) are known. This sort of connector has a terminal fitting provided at a terminal of a core wire of an electric wire, and a connector housing that holds the terminal fitting. In order to prevent liquid such as water from entering the inside from a gap between the connector and the electric wire, a sealing member is provided between the connector housing and a coating member of the electric wire.

SUMMARY

Incidentally, a sealing member of this sort of wire harness is formed in the shape of a ring, and a predetermined surface pressure is generated between the coating member of the electric wire provided on the inner side of the sealing member and the sealing member, and thus sealing (stopping of water) between the sealing member and the coating member of the electric wire is realized. At this time, the coating member is deformed by the sealing member. However, deterioration of the sealing member may progress due to heat generated in the connector and the surface pressure between the sealing member and the coating member of the electric wire may decrease, which may make it impossible to maintain the seal performance.

An exemplary aspect of the disclosure provides a wire harness in which it is possible to maintain the seal performance.

A wire harness according to an exemplary aspect includes an electric wire that has a core wire and a core wire coating that coats the core wire, a connector that is attached to an end of the electric wire, and a seal that is interposed between the electric wire and the connector, wherein a tube with a modulus of elasticity higher than that of the core wire coating, and an outer coating that coats the tube from an outer side are provided between the electric wire and the seal.

According to this aspect, a tube with a modulus of elasticity higher than that of the core wire coating is provided the electric wire and the seal. Thus, the amount of deformation by the seal is suppressed compared with the case in which the seal is directly attached to the coating (electric wire) and the same pressure is applied thereto. Thus, for example, even in the case in which deterioration of the seal progresses due to heat generated in the connector, and the surface pressure between the seal and the tube decreases, the amount of deformation of the tube by the seal is smaller than the amount in the case in which the seal is directly attached to the coating, and thus generation of gaps between the seal and the tube is suppressed. Accordingly, the seal performance can be maintained. Furthermore, an outer coating that coats the tube from the outer side is provided. Thus, direct contact of the tube with the seal is suppressed, and thus damage to the seal by the tube can be suppressed. Accordingly, the seal performance can be maintained.

In the above-described wire harness, it is preferable that the outer coating is formed by a heat shrinkable tube.

According to this aspect, the outer coating is formed by a heat shrinkable tube. Thus, the outer coating before shrinkage can easily coat the tube, and can be easily attached to the electric wire.

In the above-described wire harness, it is preferable that the outer coating partially abuts against the core wire coating and is made of a same material as the core wire coating.

According to this aspect, the outer coating is made of the same material as the core wire coating. Thus, when the outer coating abuts against the core wire coating, the core wire coating and the outer coating are expected to be put into an intimate contact state, and thus the sealing can be realized between the core wire coating and the outer coating.

With the wire harness according to aspects of the present disclosure, it is possible to maintain the seal performance.

DETAILED DESCRIPTION OF EMBODIMENTS

Hereinafter, an embodiment will be described with reference to the attached drawings. In the attached drawings, for the sake of ease of description, part of constituent elements may be exaggerated or simplified. Furthermore, in the attached drawings, proportions of constituent elements may be different from those in the actual state.

Figure 1:
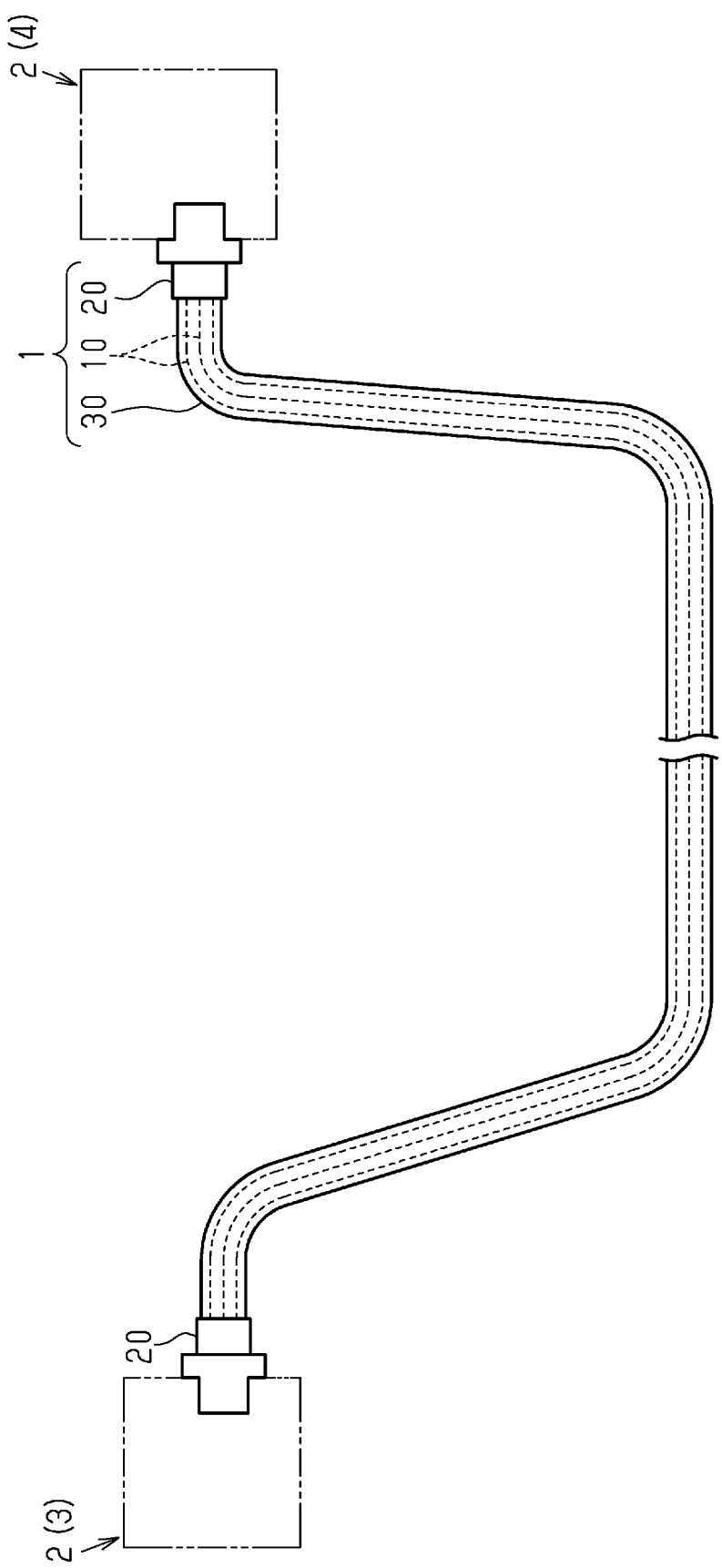
FIG. 1 is a schematic configuration diagram showing a wire harness according to an embodiment.

A wire harness 1 shown in FIG. 1 electrically connects two, three or more electrical devices (devices) 2. The wire harness 1 of this embodiment electrically connects an inverter 3 installed in the front portion of a vehicle such as a hybrid car or an electric vehicle, and a high-voltage battery 4 installed on the rear side of the inverter 3 in the vehicle. The wire harness 1 is arranged, for example, so as to extend under a floor of the vehicle. The inverter 3 is connected to a motor for driving wheels (not shown) that serves as the power source for a vehicle to travel. The inverter 3 generates AC power from DC power from the high-voltage battery 4 and supplies the AC power to the motor. The high-voltage battery 4 is, for example, a battery capable of supplying a voltage of several hundred volts.

The wire harness 1 has a plurality of (two, in this embodiment) electric wires 10, a pair of connectors 20 that are attached to the respective ends of the electric wires 10, and a protective tube 30 that collectively encloses the plurality of electric wires 10. One of the connectors 20 is connected to the inverter 3, and the other connector 20 is connected to the high-voltage battery 4. The protective tube 30 may be constituted by, for example, a pipe made of metal or resin, a flexible corrugated tube made of resin or the like, a waterproof cover made of rubber or the like, or a combination thereof. The protective tube 30 protects, for example, the electric wires 10 contained therein from flying objects or liquid.

Each electric wire 10 has a core wire 11, and a core wire coating member 12 (core wire coating) that coats the outer circumference of the core wire 11. The core wire 11 may be constituted by, for example, a twisted wire obtained by twisting a plurality of metal element wires. The core wire 11 is made of, for example, a metal with excellent conductivity such as copper, a copper alloy, aluminum, or an aluminum alloy. The core wire coating member 12 coats, for example, the entire outer circumferential face of the core wire 11 in intimate contact therewith. The core wire coating member 12 is made of, for example, an insulating material such as cross-linked polyethylene. The core wire coating member 12 can be formed, for example, through extrusion molding (extrusion coating) on the core wire 11.

Figure 2:
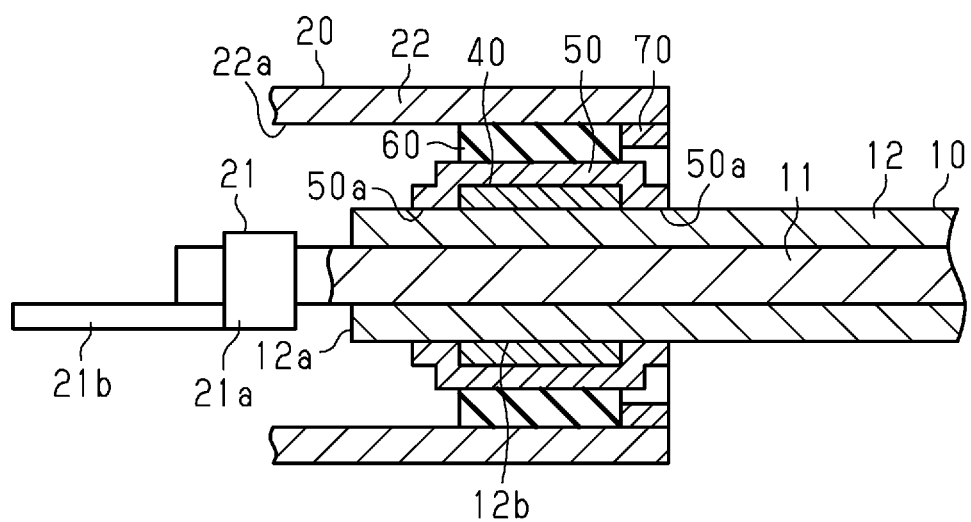
FIG. 2 is a cross-sectional view around a connector of the wire harness according to the embodiment.

As shown in FIG. 2, each connector 20 has a terminal fitting 21 and a connector housing 22.

The terminal fitting 21 is connected to ends of the electric wires 10. The terminal fitting 21 has a barrel portion 21a and a terminal portion 21b. The barrel portion 21a is electrically connected to the core wires 11 of the electric wires 10 through crimping to the core wires 11 of the electric wires 10.

The connector housing 22 is formed, for example, substantially in the shape of a tube. The connector housing 22 is made of resin.

Furthermore, the wire harness 1 of this embodiment has a tubular member 40 (tube), an outer coating member 50 (outer coating), and a sealing member 60 (seal) between the inner circumferential face 22a of the connector housing 22 and the core wire coating members 12.

The tubular member 40 is substantially in the shape of a cylinder, and is held in intimate contact with the core wire coating member 12 and the outer coating member 50 throughout the circumferential direction, between the core wire coating member 12 and the outer coating member 50. The tubular member 40 of this example is provided at a position away from the ends 12a of the core wire coating members 12. The tubular member 40 is made of a material (constituent material) with a modulus of elasticity higher than that of the core wire coating member 12. Examples thereof include metal and resin. Furthermore, the material with a modulus of elasticity higher than that of the core wire coating member 12 may be the same cross-linked polyethylene as the core wire coating member 12. For example, the modulus of elasticity of the tubular member 40 can be increased and the tubular member 40 can be made less likely to be deformed than the core wire coating member 12, by setting the degree of cross-linkage (cross-link density) of cross-linked polyethylene that is used for the tubular member 40 higher than that for the core wire coating member 12. For example, the cross-linked polyethylene that is used for the core wire coating member 12 is an example of a first cross-linked polymer in which molecular chains made of or containing a first monomer (ethylene) are cross-linked at a first degree of cross-linkage, and the cross-linked polyethylene that is used for the tubular member 40 is an example of a second cross-linked polymer in which molecular chains made of or containing the first monomer (ethylene) are cross-linked at a second degree of cross-linkage that is higher than the first degree of cross-linkage.

The outer coating member 50 is formed in the shape of a tube that coats the tubular member 40 from the outer side in the radial direction. The outer coating member 50 is constituted by, for example, a heat shrinkable tube. The outer coating member 50 may be made of, for example, the same material as the core wire coating member 12, and examples thereof include cross-linked polyethylene. Furthermore, the length of the outer coating member 50 in the longitudinal direction of the electric wires 10 is longer than the length of the tubular member 40 in the longitudinal direction of the electric wires 10. The outer coating member 50 coats the proximal end face and the distal end face of the tubular member 40, and inner circumferential faces 50a at two ends (the proximal end and the distal end) of the outer coating member 50 abut against outer circumferential face 12b of the core wire coating member 12. That is to say, the inner circumferential faces 50a of the proximal end and the distal end of the outer coating member 50 are intimate contact with the core wire coating member 12 throughout the circumferential direction. In this configuration, if the outer coating member 50 and the core wire coating member 12 are made of, for example, the same material that may be cross-linked polyethylenes with different degrees of cross-linkage as described above, the outer coating member 50 and the core wire coating member 12 are likely to bind to each other in a molecular level, and can firmly bind to each other, and thus the intimate contact state can be easily maintained, which prevents liquid such as water from entering a gap between the outer coating member 50 and the core wire coating member 12. In this example, the outer coating member 50 is provided at a position away from the ends 12a of the core wire coating members 12. That is to say, the outer coating member 50 does not coat the ends 12a of the core wire coating members 12.

The sealing member 60 may be constituted by, for example, a rubber plug. The sealing member 60 is held in intimate contact with the connector housing 22 and the outer coating member 50 throughout the circumferential direction, between the inner circumferential face 22a of the connector housing 22 and the outer coating member 50. A retainer 70 is attached to the connector housing 22, on the opposite side of the terminal fitting 21 with respect to the sealing member 60.

Hereinafter, actions of this embodiment will be described.

According to the wire harness 1 of this embodiment, the tubular member 40 with a modulus of elasticity higher than that of the core wire coating member 12, and the outer coating member 50 that coats the tubular member 40 are provided between the sealing member 60 and the core wire coating member 12 arranged inside the connector housing 22. Accordingly, even when the pressure is applied from the sealing member 60 toward the tubular member 40 (to the inner side in the radial direction), the amount of deformation of the tubular member 40 is suppressed compared with the core wire coating member 12. Furthermore, since the tubular member 40 is coated by the outer coating member 50, direct contact of the tubular member 40 with the sealing member 60 is suppressed.

Hereinafter, effects of this embodiment will be described.

(1) Since a tubular member 40 provided between an electric wire 10 and a sealing member 60 has a modulus of elasticity higher than that of the core wire coating member 12, the amount of deformation by the sealing member 60 is suppressed compared with the case in which the sealing member 60 is directly attached to the core wire coating member 12 (the electric wire 10) and the same pressure is applied thereto. Thus, for example, even in the case in which deterioration of the sealing member 60 progresses due to heat generated in the connector 20, and the surface pressure between the sealing member 60 and the tubular member 40 decreases, the amount of deformation of the tubular member 40 by the sealing member 60 is smaller than the amount in the case in which the sealing member 60 is directly attached to the core wire coating member 12, and thus generation of gaps between the sealing member 60 and the tubular member 40 is suppressed. Accordingly, the seal performance can be maintained. Furthermore, since an outer coating member 50 that coats the tubular member 40 from the outer side is provided, direct contact of the tubular member 40 with the sealing member 60 is suppressed, and thus damage to the sealing member 60 by the tubular member 40 can be suppressed. Accordingly, the seal performance can be maintained.

(2) Since the outer coating member 50 is constituted by a heat shrinkable tube, the outer coating member 50 before shrinkage can easily coat the tubular member 40, and can be easily attached to the electric wire 10.

(3) Since the outer coating member 50 is made of the same material as the core wire coating member 12, when the outer coating member 50 abuts against the core wire coating member 12, the core wire coating member 12 and the outer coating member 50 are expected to be put into an intimate contact state, and thus the sealing can be realized between the core wire coating member 12 and the outer coating member 50.

Note that the foregoing embodiment may be modified as follows.

In the foregoing embodiment, the inner circumferential faces 50a at two ends (the proximal end and the distal end) of the outer coating member 50 abut against the outer circumferential face 12b of the core wire coating member 12, but the configuration is not limited to this. For example, it is also possible to employ a configuration in which the inner circumferential face at the distal end of the outer coating member 50 close to the terminal fitting 21 does not abut against the outer circumferential face 12b of the core wire coating member 12, and the inner circumferential face at the proximal end of the outer coating member 50 close to the retainer 70 abuts against the outer circumferential face 12b of the core wire coating member 12. Even with this configuration, liquid is prevented from entering from the retainer 70 side, that is, from the opening of the connector housing 22, and thus the sealing can be realized between the core wire coating member 12 and the outer coating member 50.

In the foregoing embodiment, the outer coating member 50 is constituted by a heat shrinkable tube, but the configuration is not limited to this.

In the foregoing embodiment, the outer coating member 50 and the core wire coating member 12 are made of the same material (e.g., polymers made of the same monomer or containing the same monomer unit, and having different moduli of elasticity or degrees of cross-linkage), but the configuration is not limited to this, and it is also possible that they are made of different materials. For example, it is also possible that the core wire coating member 12 is made of a first polymer having a first monomer unit, and the outer coating member 50 is made of a second polymer having a second monomer unit that is different from the first monomer unit. In this case, the outer coating member 50 may be made of a member with substantially the same modulus of elasticity as the core wire coating member 12, or may be made of a member with a modulus of elasticity higher than that of the core wire coating member 12 and lower than that of the outer coating member 50.

In the foregoing embodiment, the outer coating member 50 is provided at a position away from the end 12a of the core wire coating member 12, and does not coat the end 12a, but the configuration is not limited to this. It is also possible to employ a configuration in which the end 12a of the core wire coating member 12 is covered by part of the outer coating member 50.

The outer circumferential face and the inner circumferential face of the sealing member 60 may be referred to as a radially outer sealing face and a radially inner sealing face of the sealing member 60. The outer circumferential face and the inner circumferential face of the tubular member 40 may be referred to as a radially outer face and a radially inner face of the tubular member 40.

The coating member 12 of the electric wire 10 may have the same, that is, a constant first diameter along the entire length in the longitudinal direction of the coating member 12, but it is also possible that the coating member 12 has the same, that is, a constant first diameter at least in a predetermined lengthwise portion arranged inside the connector housing 22. In the example shown in the drawings, the coating member 12 is constituted by a single coating layer.

The tubular member 40 is in intimate contact with the outer circumferential face of the coating member 12, preferably in a liquid-tight manner, at a local position on the coating member 12 in the longitudinal direction, and has a large-diameter portion with a second diameter that is larger than the first diameter of the coating member 12, at the local position on the coating member 12. In the example shown in the drawings, the tubular member 40 is constituted by a single tube.

In the example shown in the drawings, the outer coating member 50 encapsulates the tubular member 40 in cooperation with the outer circumferential face of the core wire coating member 12, on the outer circumferential face of the core wire coating member 12. The outer circumferential face of the core wire coating member 12 may be referred to as a radially outer face of the core wire coating member 12.

The sealing member 60 is sandwiched in the radial direction between the inner circumferential face 22a of the connector housing 22 and the outer circumferential face of the outer coating member 50 that coats the tubular member 40, and is held in a compressed state in the radial direction between the inner circumferential face 22a of the connector housing 22 and the outer circumferential face of the outer coating member 50. The outer circumferential face and the inner circumferential face of the sealing member 60 are respectively in intimate contact with the inner circumferential face 22a of the connector housing 22 and the outer circumferential face of the outer coating member 50, preferably in a liquid-tight manner. In the example shown in the drawings, the sealing member 60 is constituted by a single member or one-piece member.

In non-limiting examples, the length in the axial direction of the outer coating member 50 is longer than the length in the axial direction of the tubular member 40, is longer than the length in the axial direction of the sealing member 60, and is shorter than the length in the axial direction of the core wire coating member 12. In the example shown in the drawings, the tubular member 40 does not project outward in the axial direction from the opening of the connector housing 22, and the entire tubular member 40 is accommodated inside the connector housing 22. In the example shown in the drawings, the outer coating member 50 does not project outward in the axial direction from the opening of the connector housing 22, but it is also possible that it projects outward in the axial direction from the opening of the connector housing 22.

In non-limiting examples, the retainer 70 abuts against the ring-like end face of the sealing member 60, thereby preventing the sealing member 60 from being detached from the opening of the connector housing 22.

The foregoing embodiment and the modified examples may be combined as appropriate.

The present disclosure encompasses the following configurations. The reference numerals of the constituent elements of the embodiment are indicated not for limitation but for facilitating the understanding.

[Note 1]

A wire harness (1) according to some implementation examples includes: an electric wire (10) that has a core wire (11), and a core wire coating member (12) coating the core wire (11) and having a first diameter; a terminal fitting (21) that is fixed to an exposed end of the core wire (11) projecting from an end face of the core wire coating member (12); a connector housing (22) that has an opening through which the electric wire (10) can pass, and an inner circumferential face (22a) surrounding, from the outer side, a connecting portion of the core wire (11) and the terminal fitting (21); a tubular sealing member (60) that is attached to the inner circumferential face (22a) of the connector housing (22); a tubular member (40) that is attached to a radially outer face of the core wire coating member (12), at a local position on the core wire coating member (12) of the electric wire (10) in the longitudinal direction; and a tubular outer coating member (50) that encapsulates the tubular member (40) in cooperation with the radially outer face of the core wire coating member (12), on the radially outer face of the core wire coating member (12), wherein the tubular member (40) has a large-diameter portion with a second diameter that is larger than the first diameter of the core wire coating member (12), at the local position on the core wire coating member (12) in the longitudinal direction, the sealing member (60) is sandwiched in the radial direction between the inner circumferential face (22a) of the connector housing (22) and a radially outer face of the outer coating member (50) that coats the tubular member (40), and is held in a compressed state in the radial direction between the inner circumferential face (22a) of the connector housing (22) and the radially outer face of the outer coating member (50), the core wire coating member (12) is made of a first electrically insulating synthetic resin with a first modulus of elasticity, and the tubular member (40) is made of a second electrically insulating synthetic resin with a second modulus of elasticity that is higher than the first modulus of elasticity.

[Note 2] In some implementation examples, the first electrically insulating synthetic resin is made of a first polymer made of a first monomer or containing a first monomer unit, and having a first degree of cross-linkage, and the second electrically insulating synthetic resin is a second polymer made of the first monomer or containing the first monomer unit, and having a second degree of cross-linkage that is different from the first degree of cross-linkage.

[Note 3] In some implementation examples, the first electrically insulating synthetic resin is cross-linked polyethylene with a first degree of cross-linkage, and the second electrically insulating synthetic resin is cross-linked polyethylene with a second degree of cross-linkage that is different from the first degree of cross-linkage.

[Note 4] In some implementation examples, the length in the axial direction of the outer coating member (50) is longer than the length in the axial direction of the tubular member (40), is longer than the length in the axial direction of the sealing member (60), and is shorter than the length in the axial direction of the core wire coating member (12).

It will be appreciated by those skilled in the art that the present disclosure may be embodied in other specific modes without departing from the technical idea thereof. For example, some of constituent elements described in the embodiment (or one or a plurality modes thereof) may be omitted or combined. The scope of the disclosure is to be determined by reference to the claims along with the full range of equivalents to which such claims are entitled.

The invention claimed is:

1. A wire harness comprising
   an electric wire that has a core wire and a core wire coating that coats the core wire,
   a connector that is attached to an end of the electric wire, and
   a seal that is interposed between the electric wire and the connector,
   wherein a tube with a modulus of elasticity higher than that of the core wire coating, and an outer coating that coats the tube from an outer side of the tube are provided between the electric wire and the seal.

2. The wire harness according to claim 1, wherein the outer coating is formed by a heat shrinkable tube.

3. The wire harness according to claim 1, wherein the outer coating partially abuts against the core wire coating, and is made of a same material as the core wire coating.

* * * * *